United States Patent
Zhao et al.

(10) Patent No.: US 8,665,546 B1
(45) Date of Patent: Mar. 4, 2014

(54) ADAPTIVE THRESHOLD FOR DETECTING TOUCHDOWN OR CONTAMINATION

(75) Inventors: Hongchao Tim Zhao, San Jose, CA (US); Jiangang Liang, San Jose, CA (US); Yilin Cai, Fremont, CA (US); Don Brunnett, Pleasanton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 833 days.

(21) Appl. No.: 12/684,045

(22) Filed: Jan. 7, 2010

(51) Int. Cl.
*G11B 21/02* (2006.01)

(52) U.S. Cl.
USPC .......................................................... 360/55

(58) Field of Classification Search
USPC .......................................................... 360/55
See application file for complete search history.

(56) References Cited

U.S. PATENT DOCUMENTS

| | | | |
|---|---|---|---|
| 6,097,559 A | 8/2000 | Ottesen et al. | |
| 6,288,856 B1 | 9/2001 | Ottesen et al. | |
| 6,293,135 B1 | 9/2001 | Marchon et al. | |
| 6,417,981 B1 | 7/2002 | Smith | |
| 6,674,590 B2 | 1/2004 | Ottesen et al. | |
| 6,700,724 B2 | 3/2004 | Riddering et al. | |
| 6,717,764 B2 * | 4/2004 | Lake | 360/75 |
| 6,785,081 B2 * | 8/2004 | Chapin et al. | 360/75 |
| 7,180,692 B1 | 2/2007 | Che et al. | |
| 7,199,961 B1 | 4/2007 | Wu et al. | |
| 7,292,401 B2 | 11/2007 | Shen et al. | |
| 7,359,139 B1 | 4/2008 | Wu et al. | |
| 7,394,611 B1 * | 7/2008 | Rahgozar | 360/75 |
| 7,405,896 B2 * | 7/2008 | Hirano et al. | 360/75 |
| 7,423,830 B2 | 9/2008 | Ma et al. | |
| 7,440,220 B1 | 10/2008 | Kang et al. | |
| 7,583,466 B2 | 9/2009 | Kermiche et al. | |
| 7,616,398 B2 | 11/2009 | Gong et al. | |
| 7,656,600 B2 * | 2/2010 | Dakroub et al. | 360/46 |
| 7,679,857 B2 | 3/2010 | Zhu et al. | |
| 7,796,356 B1 | 9/2010 | Fowler et al. | |
| 8,059,357 B1 | 11/2011 | Knigge et al. | |
| 8,085,490 B2 * | 12/2011 | Franca-Neto et al. | 360/75 |
| 8,098,450 B2 * | 1/2012 | Baumgart et al. | 360/75 |
| 2006/0132961 A1 * | 6/2006 | Ma | 360/75 |
| 2007/0291401 A1 | 12/2007 | Sun et al. | |
| 2008/0278835 A1 * | 11/2008 | Dakroub et al. | 360/31 |
| 2011/0157736 A1 * | 6/2011 | Contreras et al. | 360/29 |
| 2011/0157740 A1 * | 6/2011 | Baumgart et al. | 360/75 |

* cited by examiner

*Primary Examiner* — Mark Blouin

(57) ABSTRACT

A disk drive is disclosed comprising a disk, a head for writing data to the disk, and control circuitry coupled to the head. The control circuitry is operable to determine a first set of fly height values and determine a threshold based on the first set of fly height values. The control circuitry determines a second set of fly height values, adjusts the threshold based on the second set of fly height values, and detects a head characteristic based on the adjusted threshold. The head characteristic is detected by detecting a head touchdown event and/or detecting contamination related to the head based on the adjusted threshold.

28 Claims, 10 Drawing Sheets

ADAPTIVE THRESHOLD FOR DETECTING TOUCHDOWN OR CONTAMINATION

BACKGROUND

Disk drives typically use heads residing on sliders to read from and write to the magnetic media. Read and write transducers residing in the head are flown at a small, controlled spacing above the magnetic medium during read and write operations. To determine the controlled spacing, it is desirable for the disk drive to detect at what point the head contacts the media, known as a touchdown event.

For example, heads typically use a thermal actuator that generates heat to control the head-media spacing. Heat generated by the thermal actuator causes local thermal expansion of the head, which locally reduces the spacing between the head and magnetic media. The thermal actuator can be driven to induce sufficient heating for contact between the head and media. Detecting the touchdown point may be performed on each drive during initial drive calibration to determine appropriate thermal actuator biasing for normal drive operation. Touchdown may also be detected during normal drive operation as well as in testing.

Conventional touchdown detection may be performed using a variety of techniques. For example, touchdown may be detected through disk slow down, readout channel noise, strain gauges, PES variations, and/or acoustic emission. Touchdown may be declared when a fly height value exceeds a fixed threshold.

Accordingly, what is needed is a system and method for providing improved touchdown detection.

DETAILED DESCRIPTION OF THE PREFERRED EMBODIMENTS

Figure 1A:
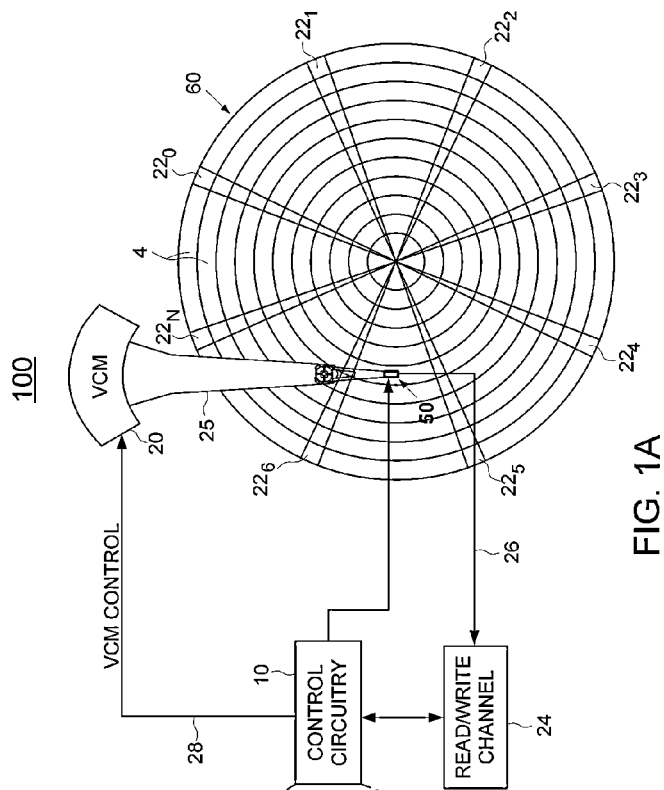
FIG. 1A shows a disk drive according to an embodiment of the present invention comprising a disk, a head actuated over the disk, and control circuitry.

FIG. 1A shows a disk drive 100 according to an embodiment of the present invention comprising a disk 60 having a plurality of tracks 4, and a head 50 actuated over the disk 60. The head 50 may also comprise a thermal actuator (not shown). The disk drive 100 further comprises control circuitry 10 which executes the flow diagram of FIG. 1B wherein the control circuitry 10 determines a first set of fly height values by adjusting an actuator power level to move the head 50 closer to the disk 60 (step 11) and determines a fly height value associated with the head 50 (step 12).

At step 13, the control circuitry 10 determines whether more fly height values should be determined. For example, the control circuitry may determine whether the first set of fly height values is equal to N number of fly height values. If more fly height values are needed, steps 11 and 12 are repeated.

At step 14, the control circuitry determines a threshold based on the first set of fly height values. The control circuitry 10 adjusts the actuator power level to move the head closer to the disk 60 (step 15) and determines the fly height value associated with the head (step 16) to determine a second set of fly height values. The control circuitry 10 adjusts the threshold based on the second set of fly height values (step 17) and detects a head characteristic based on the adjusted threshold (step 18). At step 19, if no head characteristic is detected, control circuitry 10 repeats steps 15-18. In some embodiments, the head characteristic may be detected by detecting a head touchdown event and/or detecting contamination related to the head based on the adjusted threshold as will be described in further detail below.

Some embodiments of the present invention are desirable for situations when a slow ramping condition of the fly height values occurs, for example, due to contamination related to particulate build-up on the head that alters the flying characteristics of the head. The adaptive threshold may avoid prematurely declaring touchdown due to this ramping condition and accurately detect the actual touchdown event.

Any suitable control circuitry 10 may be employed to implement the embodiments of the present invention. In one embodiment, the control circuitry 10 comprises a microprocessor executing instructions, the instructions being operable to cause the microprocessor to perform the steps of FIG. 1B as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk 60 and read into a volatile semiconductor memory when the disk drive is powered on. In yet another embodiment, the control circuitry 10 comprises suitable logic circuitry, such as state machine circuitry.

In the embodiment of FIG. 1A, the head 50 is connected to a distal end of an actuator arm 18 which is rotated about a pivot by a voice coil motor (VCM) 20 in order to actuate the head 50 radially over the disk 60. The VCM 20 comprises a voice coil which, when energized with current by the control circuitry 10, generates a magnetic flux which interacts with the magnetic flux from permanent magnets to generate a torque that rotates the actuator arm 18 about the pivot. Also in the embodiment of FIG. 1A, the disk 60 comprises a plurality of embedded servo sectors $22_0$-$22_N$ each comprising coarse head position information, such as a track address, and fine head position information, such as servo bursts. As the head 50 passes over each servo sector, a read/write channel 24 processes the read signal 26 emanating from the head 50 to demodulate the position information. The control circuitry 10 processes the position information to generate a control signal 28 applied to the VCM 20. The VCM 20 rotates the actuator arm 18 in order to position the head 50 over a target track during the seek operation, and maintains the head 50 over the target track during a tracking operation.

Figure 2:
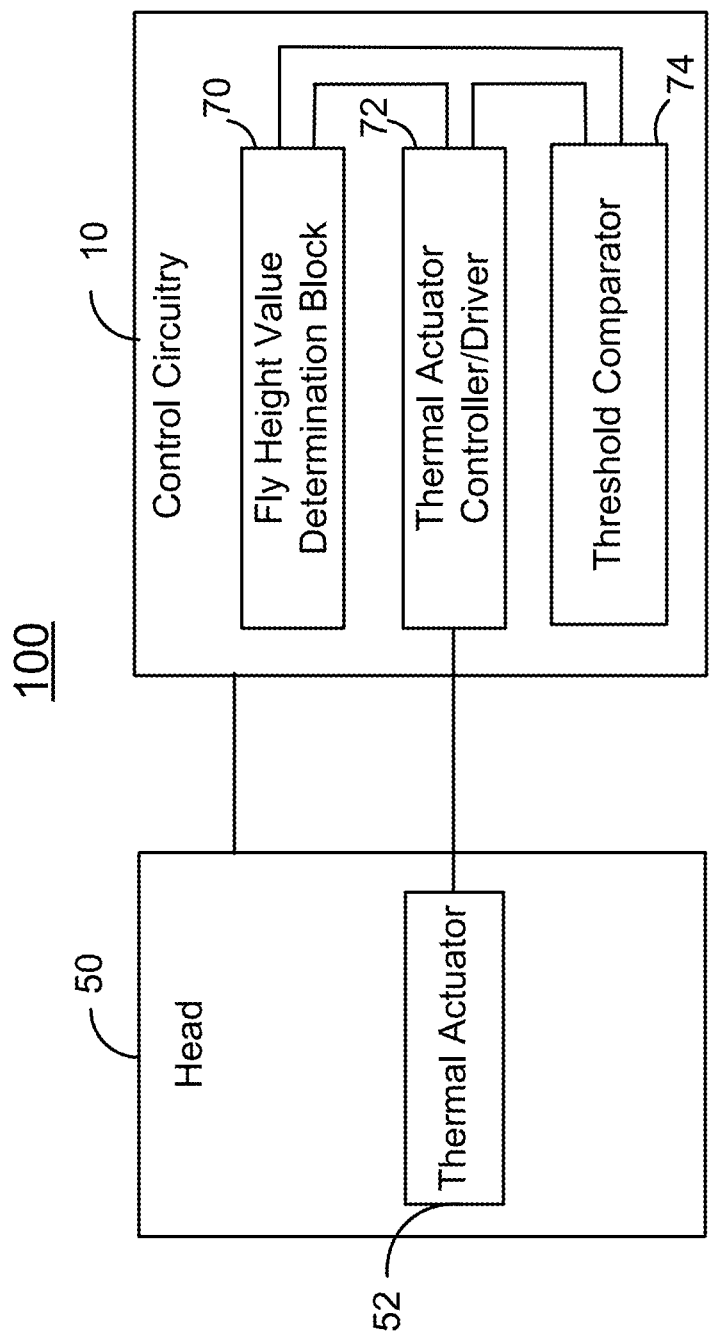
FIG. 2 illustrates a block diagram of a disk drive according to an embodiment of the present invention.

FIG. 2 illustrates a block diagram of the disk drive 100 according to an embodiment of the present invention. For simplicity, certain components are omitted. In addition, for clarity, FIG. 2 is not drawn to scale. The disk drive 100 may comprise the control circuitry 10 and the head 50. The head 50 may comprise a thermal actuator 52. The control circuitry 10 may comprise a fly height value determination block 70, a thermal actuator controller/driver 72, and a threshold comparator 74. The thermal actuator controller/driver 72 may be coupled to the thermal actuator 52, the fly height value determination block 70, and threshold comparator 74. The fly height value determination block 70 may be coupled to the threshold comparator 74. Note that the components 70, 72, and 74 may include multiple functions and thus may have multiple sub-components. Such sub-components might be split into separate components. Components of the control circuitry 10 may be located in the disk drive 100 and/or may also be used for other purposes such as read or write operations.

The thermal actuator controller/driver 72 may receive a signal from the control circuitry 10 and determine the desired level of current to be driven through the thermal actuator 52. The thermal actuator controller/driver 72 may also provide the desired level of current to the thermal actuator 52 to heat the head 50 by a desired amount.

In operation, the thermal actuator controller/driver 72 may increase the power to the thermal actuator 52 to induce touchdown or otherwise control the spacing of the head 50 relative to the disk 60. For example, a current from the thermal actuator controller/driver 72 may be driven through the thermal actuator 52, which generates heat in the region of the head 50. As a result, the head 50 may bulge outward toward the disk 60. When enough heat is generated by the thermal actuator 52, sufficient thermal protrusion may occur to produce intentional touchdown. Once the touchdown event is detected, the thermal actuator 52 may be driven at a lower power in order to ensure that there is a desired space between the head 50 and disk 60. Thus, use of the thermal actuator 52 may allow the fly height to be selected and controlled.

The fly height determination block 70 may comprise circuitry to determine a fly height value corresponding to a head position relative to the disk 60. The fly height value may correspond to any suitable value, such as a position error signal (PES) value, a leakage current value, a spindle current value, a gain value of a read channel variable gain amplifier (VGA), or a back EMF value. Also, any suitable type of measurement value that corresponds to the fly height may be used for embodiments of the present invention.

Figure 3A:
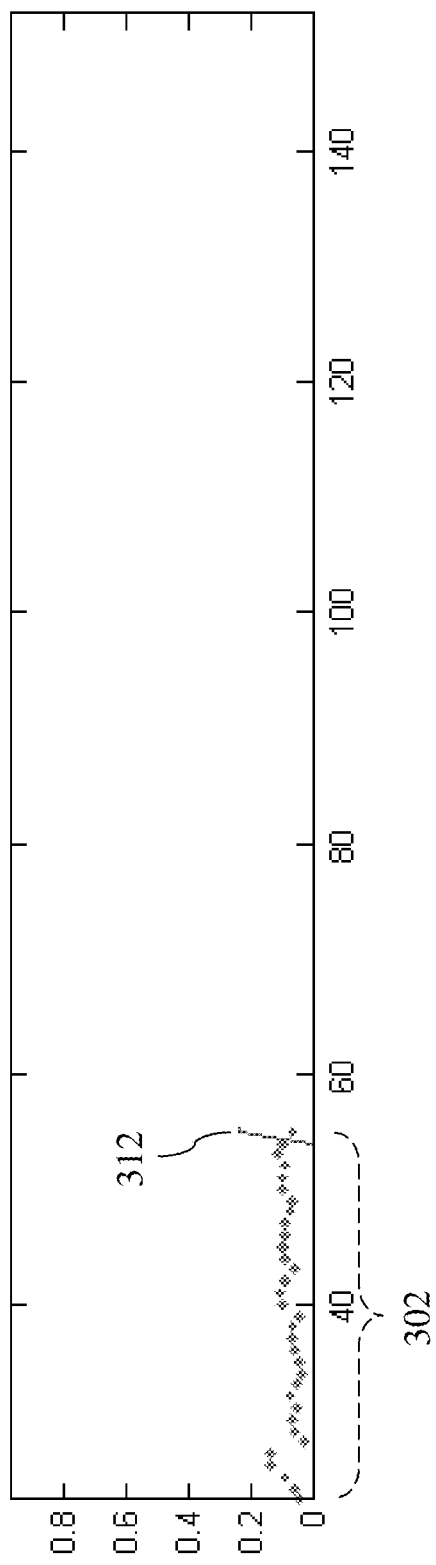
FIG. 3A is a diagram illustrating example values for a first set of fly height values and a first threshold data point according to one embodiment of the present invention.

FIG. 3A is a diagram illustrating example values for a first set of fly height values 302 and a first threshold data point 312 according to one embodiment of the present invention. The vertical axis represents a magnitude of fly height values and the horizontal axis represents thermal actuator power levels. The example data points and graph shown in FIG. 3A are for explanatory purposes only, as data points from other embodiments will vary widely depending on numerous circumstances and conditions.

The control circuitry 10 adjusts the fly height to move the head 50 closer to the disk 60 by increasing the thermal actuator power level. The control circuitry 10 determines the first set of fly height values 302 by adjusting the actuator power level and determining a fly height value corresponding to each thermal actuator power level. For example, the fly height determination block 70 may determine the fly height values by measuring a position error signal (PES) according to one embodiment of the invention.

The first set of fly height values 302 may be equal to N number of fly height values according to an embodiment of the invention. The threshold comparator 74 determines the threshold based on the first set of N fly height values 302. A first threshold data point 312 is illustrated in FIG. 3A.

Figure 3B:
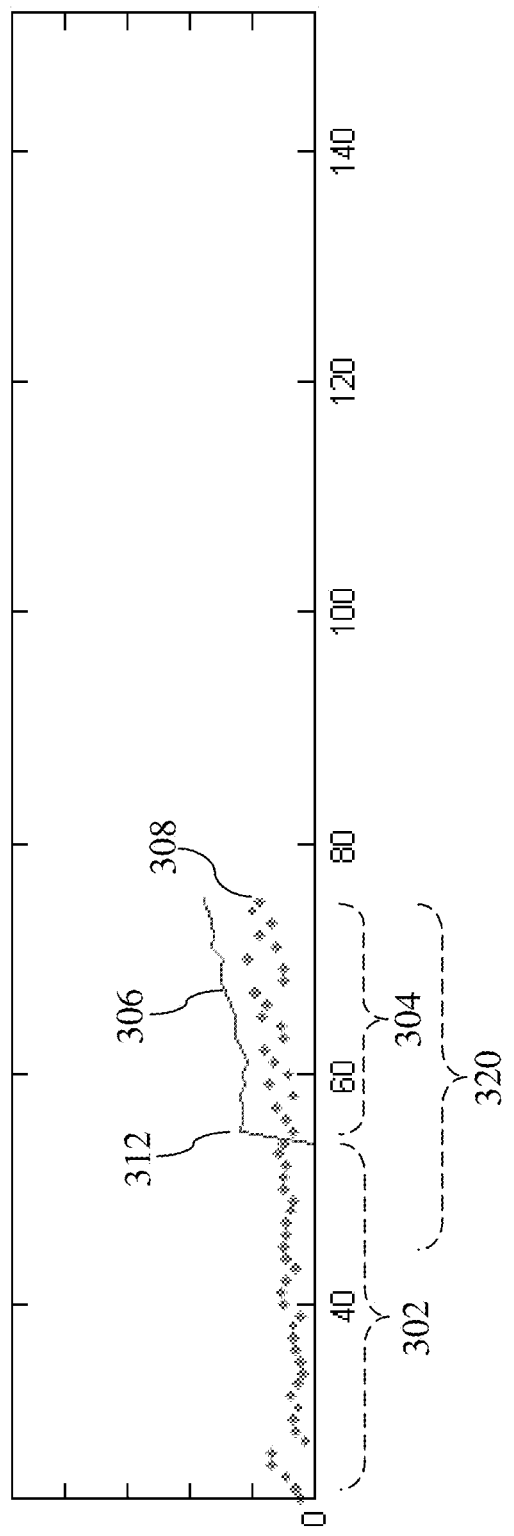
FIG. 3B is a diagram illustrating example values for the first set of fly height values, a second set of fly height values, a moving window, and an adjusted threshold according to one embodiment of the present invention.

FIG. 3B is a diagram illustrating example values for the first set of fly height values 302, a second set of fly height values 304, the moving window 320, and an adjusted threshold 306 according to one embodiment of the present invention. The control circuitry 10 determines the second set of fly height values 304 by continuing to adjust the thermal actuator power level to move the head closer to the disk 60. The control circuitry 10 then adjusts the threshold 306 based on the second set of fly height values 304.

In one embodiment, the threshold may be adjusted based solely on the second set of fly height values 304. In another embodiment, the threshold may be adjusted based on the first and second sets of fly height values.

For example, the threshold may be adjusted as a moving window 320 of the N most recent fly height values. In this embodiment, the moving window 320 may include values from the first set of fly height values 302 and the second set of fly height values 304. As the actuator power level is increased, a new fly height value 308 (most recent) may be added to the second set of fly height values 304 and the oldest first fly height value of the first set 302 may be dropped so as to maintain the moving window 320 of N most recent values.

For example, the threshold 306 may be adjusted based on the moving window 320 of N=32 fly height values. The initial threshold point 312 may be set when the first set of fly height values 302 includes 32 values as shown in FIG. 3A. Then, when the control circuitry 10 increases the thermal actuator power level, a $33^{rd}$ fly height value may be determined. In this example, the $33^{rd}$ fly height value may be considered as the first value of the second set of fly height values 304. The threshold 306 may then be adjusted based on the first set of 31 fly height values 302 and the second set of fly height values 304 comprising the $33^{rd}$ fly height value, with the original first fly height value of the first set of fly height values 302 being dropped from the calculation. Next, the control circuitry 10 increases the thermal actuator power level and a $34^{th}$ fly height value may be determined. The second set of fly height values 304 then comprises the $33^{rd}$ and $34^{th}$ fly height values and the threshold 306 may be adjusted based on these two values as well as the most recent 30 values from the first set of fly height values 302.

Figure 3C:
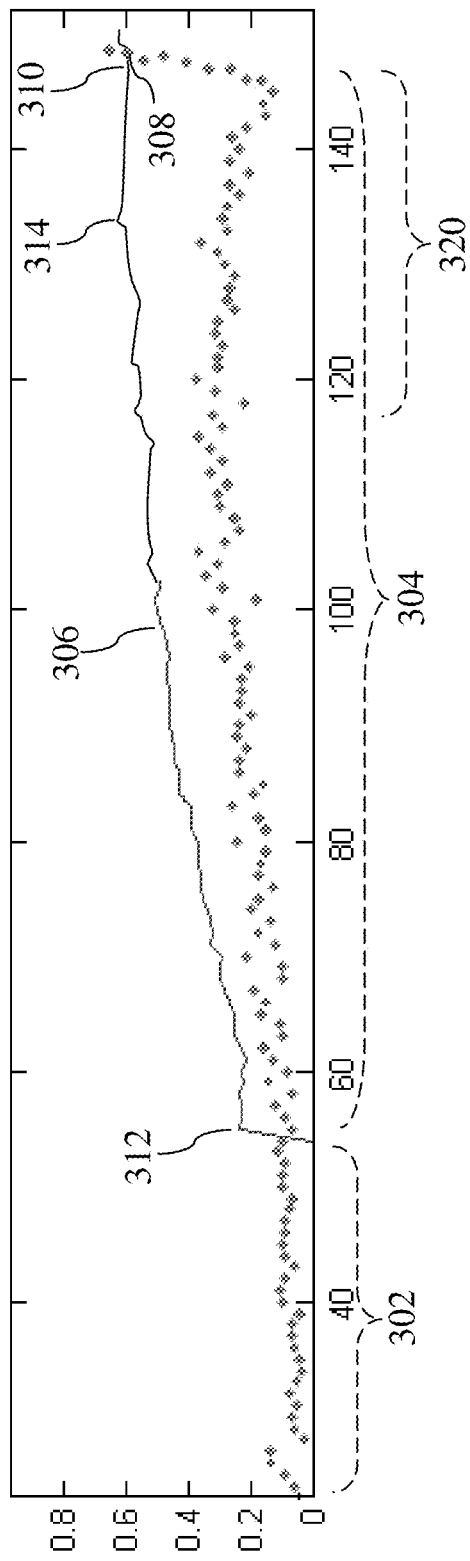
FIG. 3C is a diagram illustrating example values for the first set of fly height values, a second set of fly height values, the moving window, an adjusted threshold, and a touchdown event according to an embodiment of the present invention.

Referring to FIG. 3C, eventually, as the control circuitry 10 continues to increase the thermal actuator power level, the moving window 320 for adjusting the threshold 306 will move beyond the original 32 fly height values and only include values from the second set of fly height values 304.

Thus, in this embodiment, the control circuitry 10 adjusts the threshold 306 by evaluating the newest fly height values from the second set of fly height values 304 and dropping the oldest fly height value of the first set 302 or second set of fly height values 304.

After adjusting the threshold 306, the control circuitry 10 detects a head characteristic based on the adjusted threshold 306. In one embodiment, the head characteristic may be detected by detecting a head touchdown event 310. The head touchdown event 310 may be detected based on a most recent fly height value 308 exceeding the adjusted threshold 306, such as illustrated in FIG. 3C when the most recent fly height value 308 is equal to the adjusted threshold 306. In some embodiments, the head touchdown event 310 may be preceded by a sharp increase in a slope of the measured fly height values 304. For example, this may correspond to a sharp increase in the magnitude of the position error signal (PES) according to an embodiment of the invention.

Figure 3D:
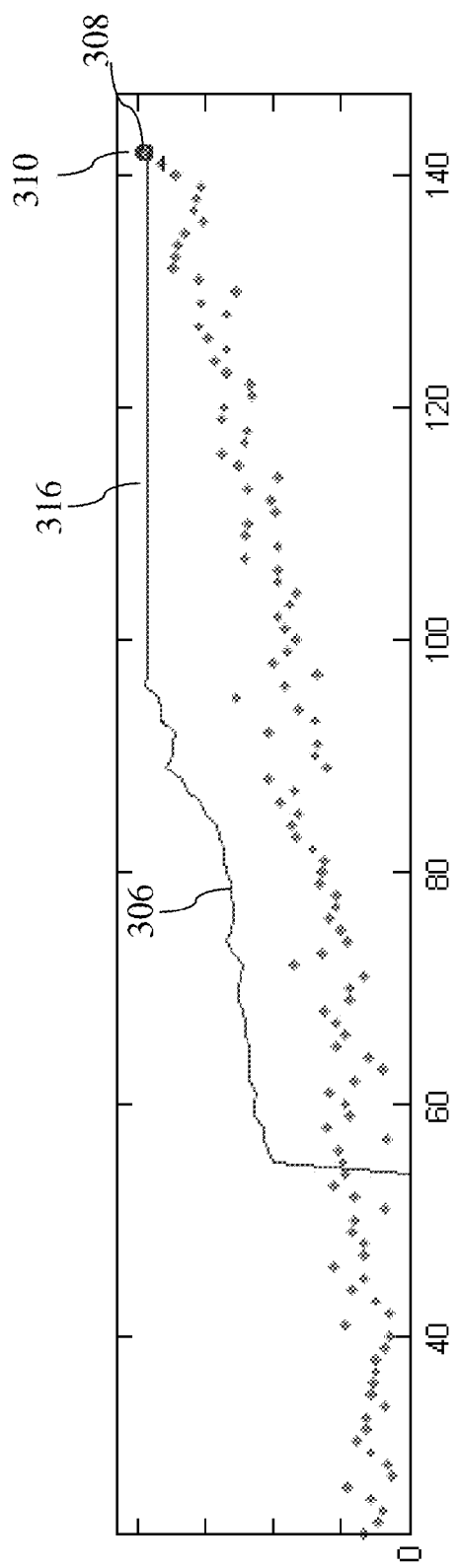
FIG. 3D is a diagram illustrating an adjusted threshold, a fixed threshold, and a touchdown event according to an alternative embodiment of the present invention.

FIG. 3D is a diagram illustrating an adjusted threshold 306, a fixed threshold 316, and a touchdown event 310 according to an alternative embodiment of the present invention. In this embodiment, the control circuitry 10 adjusts the threshold 306 as described above and then determines a fixed threshold 316 based on evaluating the most recent fly height values. For example, the fixed threshold 316 may be determined after the threshold 306 has been adjusted a minimum number of times. The head touchdown event 310 may be detected based on a most recent fly height value 308 exceeding the fixed threshold 316, such as illustrated in FIG. 3D when the most recent fly height value 308 is equal to the fixed threshold 316. This embodiment may be used in situations where, absent fixing the threshold 316, the threshold 306 would undesirably increase due to increasing fly height values related to a touchdown event 310 before the actual touchdown event 310 is detected. In an alternative embodiment, the head characteristic is detected prior to adjusting the threshold in block 17.

Figure 1B:
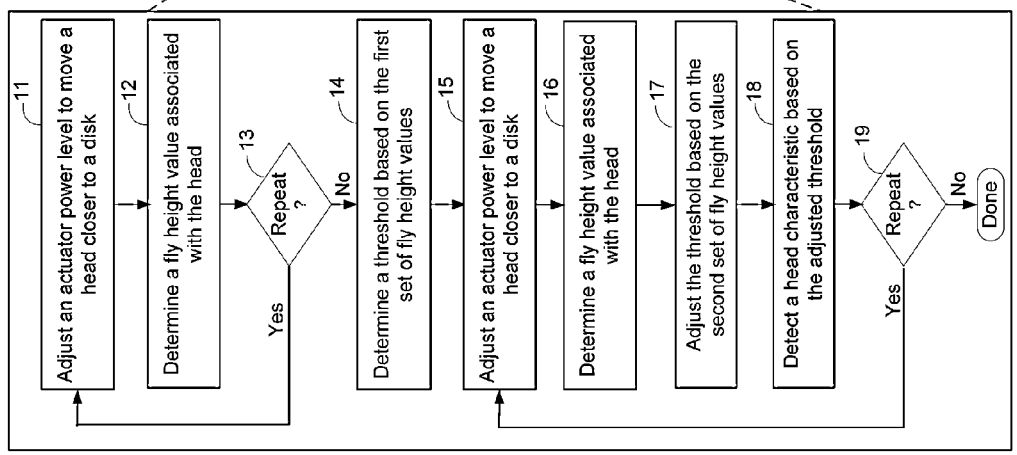
FIG. 1B is a flow diagram of acts executed by the control circuitry according to an embodiment of the present invention.
Figure 4:
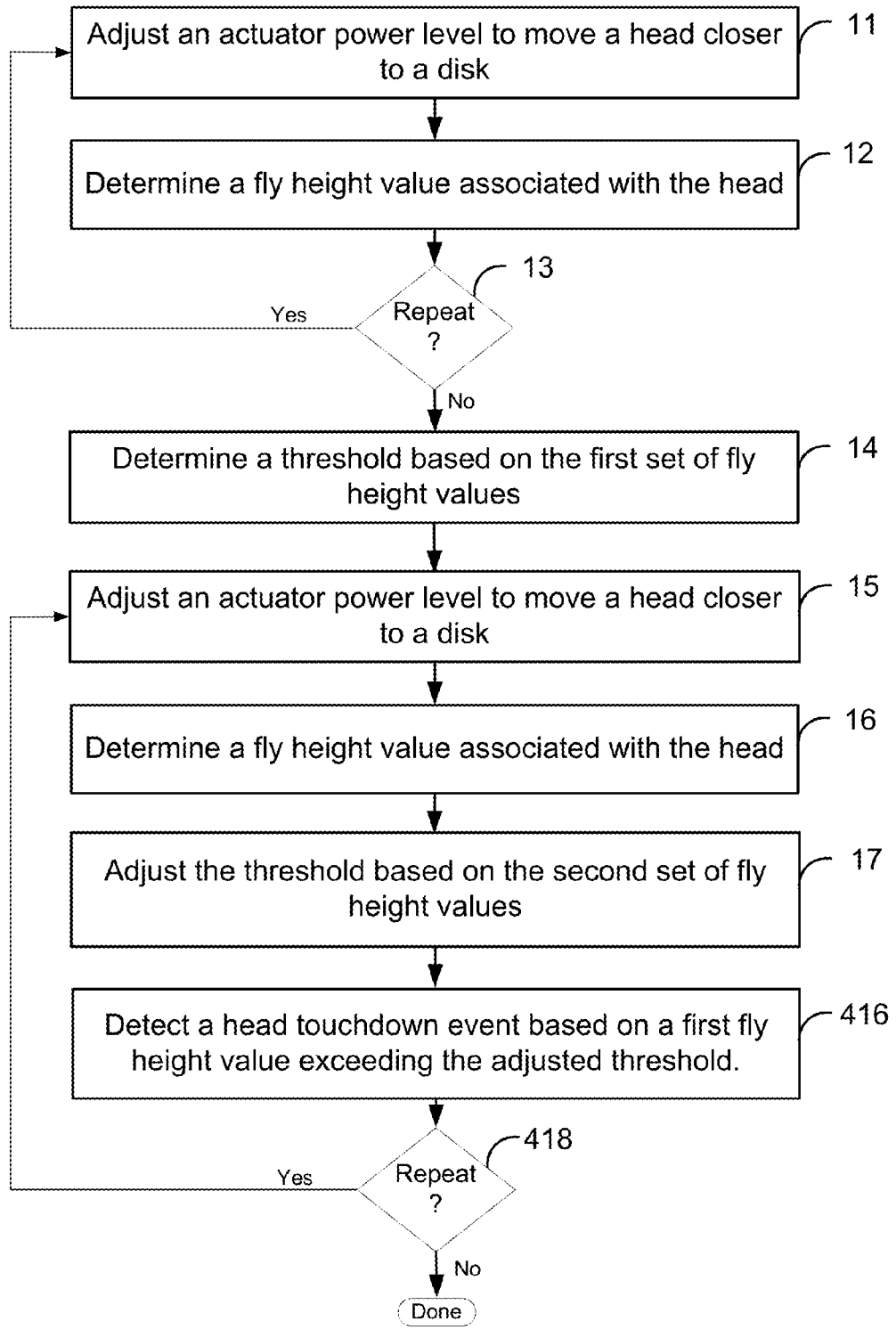
FIG. 4 depicts a method for detecting a head touchdown event executed by the control circuitry according to one embodiment that enhances the method depicted in FIG. 1B.

FIG. 4 depicts a method for detecting a head touchdown event 310 executed by the control circuitry 10 according to one embodiment that enhances the method depicted in FIG. 1B. Although depicted as a flow of single steps, the steps of the method may be performed in parallel and/or continuously. At block 416, the control circuitry 10 detects a head touchdown event 310 based on a first fly height value 308 exceeding the adjusted threshold 306, such as shown in FIG. 3C. For example, a touchdown event 310 may be detected when the most recent fly height value 308 exceeds the threshold 306. At block 418, if the head touchdown event 310 is not detected, the control circuitry 10 repeats blocks 15, 16, 17, and 416.

Figure 5:
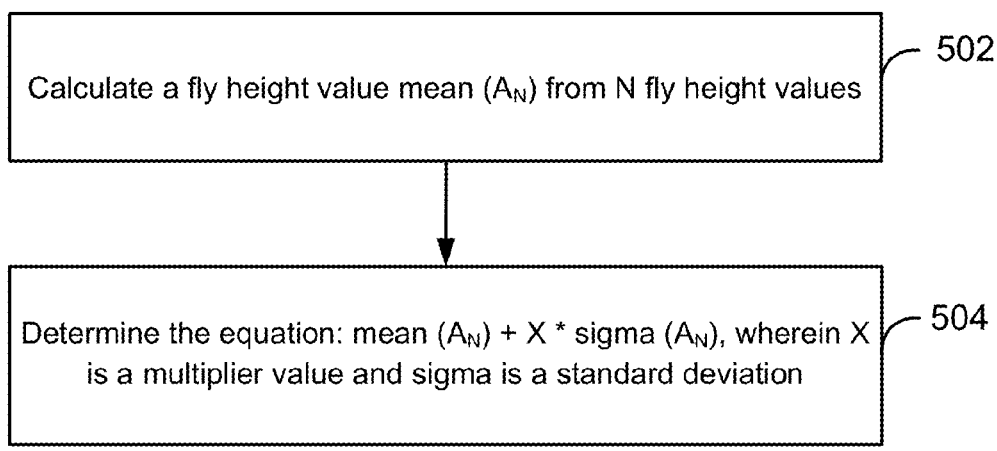
FIG. 5 depicts a method for adjusting a threshold executed by the control circuitry according to one embodiment of the invention.

FIG. 5 depicts a method for adjusting the threshold executed by the control circuitry 10 according to one embodiment of the invention. At block 502, the control circuitry 10 calculates a fly height value mean $(A_N)$ from N fly height values. At block 504, the control circuitry 10 adjusts the threshold by determining the equation mean $(A_N)$+X*sigma $(A_N)$, wherein X may be a suitable multiplier value such as within a range of 3-6 and sigma may be a standard deviation. Alternatively, block 504 may comprise adjusting the threshold by determining the equation: X*mean $(A_N)$, and X may be a multiplier value.

Embodiments of the present invention may also be used for detecting contamination related to the head 50. Referring to FIG. 3C, an unintentional slow ramping condition of the fly height values 304 may occur as the thermal actuator power is increased. This slow ramping condition may be caused by contamination related to particulate build-up on the head 50 that alters the flying characteristics of the head 50. For example, stainless steel particles may be attached to an air bearing surface (ABS) of a head 50 during a disk drive build process.

Figure 6:
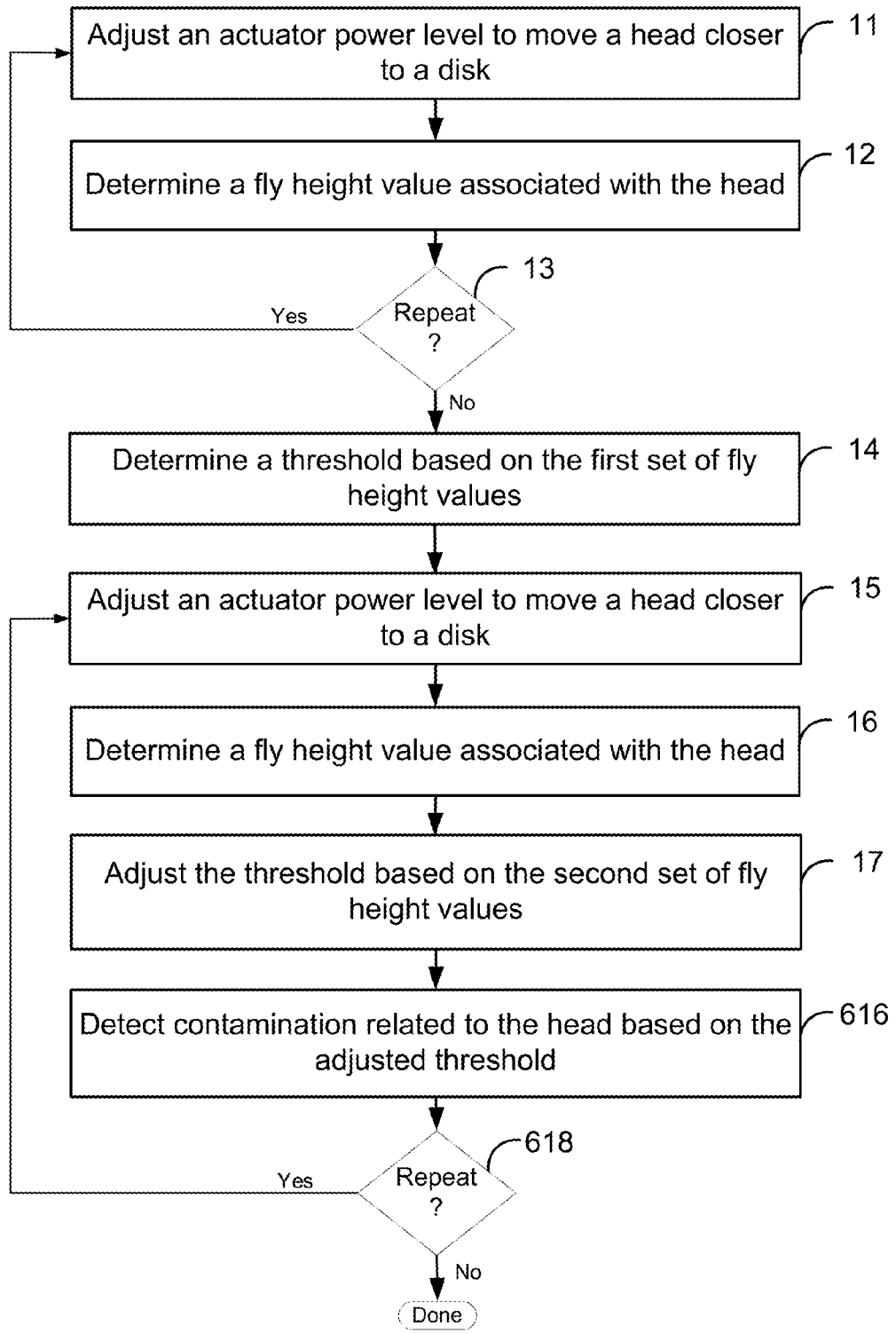
FIG. 6 depicts a method executed by the control circuitry for detecting contamination related to the head based on the adjusted threshold according to one embodiment that enhances the method depicted in FIG. 1B.

FIG. 6 depicts a method executed by the control circuitry 10 for detecting contamination related to the head 50 based on the adjusted threshold 306 according to one embodiment that enhances the method depicted in FIG. 1B. At block 616, the control circuitry 10 detects contamination related to the head 50 based on the adjusted threshold 306. At block 618, if contamination is not detected, the control circuitry 10 repeats blocks 15, 16, 17, and 616. Alternatively, block 616 may come after block 618 to detect the contamination after a sufficient number of fly height values are determined and/or another event occurs, such as touchdown is detected.

Figure 7:
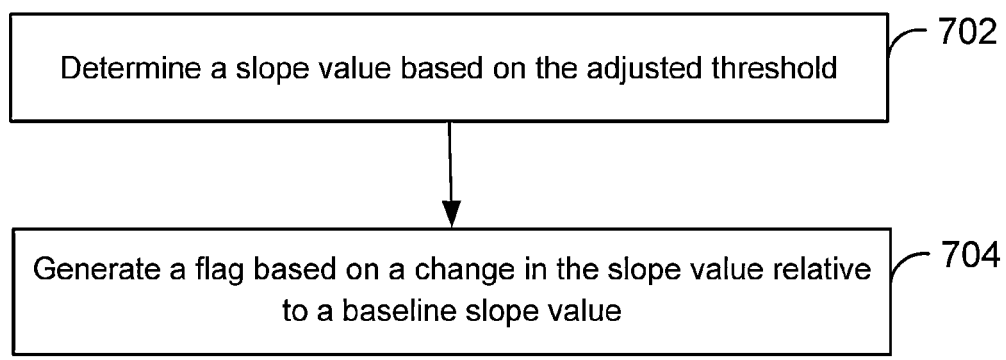
FIG. 7 depicts further acts for detecting contamination related to the head based on the adjusted threshold according to one embodiment.

FIG. 7 depicts further acts for detecting contamination related to the head 50 based on the adjusted threshold 306 according to one embodiment. At block 702, the control circuitry 10 determines a slope value based on the adjusted threshold 306. At block 704, the control circuitry 10 generates a flag based on a change in the slope value relative to a baseline slope value.

For example, in one embodiment, control circuitry 10 may determine the slope value based on the first threshold value 312, a maximum threshold value 314, and a corresponding change in thermal actuator power as illustrated in FIG. 3C. In other embodiments, control circuitry 10 may determine a histogram of the changing threshold 306. The histogram of the changing threshold 306 may trigger a flag condition as an output of control circuitry 10. Such flag conditions may be stored in a central database for monitoring during a disk drive mass production. Based on such data from volume production, a factory assembly line can be efficiently monitored through statistics process control (SPC). As result, yield and overall drive quality may be improved.

We claim:

1. A disk drive, comprising:
   a disk;
   a head for writing data to the disk; and
   control circuitry coupled to the head and operable to:
   (a) adjust an actuator power level to move a head closer to a disk;
   (b) determine a fly height value associated with the head;
   (c) repeat steps (a) and (b) at least once to determine a first set of fly height values;
   (d) determine a threshold based on the first set of fly height values;
   (e) repeat steps (a) and (b) at least once to determine a second set of fly height values;
   (f) adjust the threshold based on the second set of fly height values; and
   (g) detect the head characteristic based on the adjusted threshold.

2. The disk drive of claim 1, wherein detecting a head characteristic based on the adjusted threshold comprises detecting a head touchdown event based on a first fly height value exceeding the adjusted threshold.

3. The disk drive of claim 1, wherein adjusting the threshold based on the second set of fly height values comprises adjusting the threshold based on the first and second set of fly height values.

4. The disk drive of claim 1, wherein adjusting the threshold based on the second set of fly height values comprises calculating a fly height value mean $(A_N)$ from N fly height values.

5. The disk drive of claim 4, wherein the N fly height values comprise fly height values from the first set of fly height values and the second set of fly height values.

6. The disk drive of claim 5, wherein adjusting the threshold based on the first and second sets of fly height values further comprises determining the equation: mean $(A_N)$+ $X$*sigma $(A_N)$, wherein X is a multiplier value and sigma is a standard deviation.

7. The disk drive of claim 6, wherein X is the multiplier value within a range of 3-6.

8. The disk drive of claim 5, wherein adjusting the threshold based on the first and second sets of fly height values further comprises determining the equation: $X$*mean $(A_N)$, and X is a multiplier value.

9. The disk drive of claim 1, wherein the first and second sets of fly height values correspond to at least one of a position error signal (PES) value, a leakage current value, a spindle current value, a gain value of a read channel variable gain amplifier (VGA), and a back EMF value.

10. The disk drive of claim 1, wherein detecting a head characteristic based on the adjusted threshold comprises detecting contamination related to the head based on the adjusted threshold.

11. The disk drive of claim 10, further comprising determining a slope value based on the adjusted threshold.

12. The disk drive of claim 11, further comprising generating a flag based on a change in the slope value relative to a baseline slope value.

13. The disk drive of claim 1, wherein adjusting the actuator power level to move the head closer to the disk comprises adjusting the actuator power level of a thermal actuator coupled to the head.

14. The disk drive of claim 1, wherein adjusting the threshold based on the second set of fly height values comprises determining a fixed threshold based on evaluating at least one most recent fly height value.

15. A method of detecting a head characteristic in a disk drive comprising:
  (a) adjusting an actuator power level to move a head closer to a disk;
  (b) determining a fly height value associated with the head;
  (c) repeating steps (a) and (b) at least once to determine a first set of fly height values;
  (d) determining a threshold based on the first set of fly height values;
  (e) repeating steps (a) and (b) at least once to determine a second set of fly height values;
  (f) adjusting the threshold based on the second set of fly height values; and
  (g) detecting the head characteristic based on the adjusted threshold.

16. The method of claim 15, wherein detecting a head characteristic based on the adjusted threshold comprises detecting a head touchdown event based on a first fly height value exceeding the adjusted threshold.

17. The method of claim 15, wherein adjusting the threshold based on the second set of fly height values comprises adjusting the threshold based on the first and second set of fly height values.

18. The method of claim 15, wherein adjusting the threshold based on the second set of fly height values comprises calculating a fly height value mean $(A_N)$ from N fly height values.

19. The method of claim 18, wherein the N fly height values comprise fly height values from the first set of fly height values and the second set of fly height values.

20. The method of claim 19, wherein adjusting the threshold based on the first and second sets of fly height values further comprises determining the equation: mean $(A_N)$+ $X$*sigma $(A_N)$, wherein X is a multiplier value and sigma is a standard deviation.

21. The method of claim 20, wherein X is the multiplier value within a range of 3-6.

22. The method of claim 19, wherein adjusting the threshold based on the first and second sets of fly height values further comprises determining the equation: $X$*mean $(A_N)$, and X is a multiplier value.

23. The method of claim 15, wherein the first and second sets of fly height values correspond to at least one of a position error signal (PES) value, a leakage current value, a spindle current value, a gain value of a read channel variable gain amplifier (VGA), and a back EMF value.

24. The method of claim 15, wherein detecting a head characteristic based on the adjusted threshold comprises detecting contamination related to the head based on the adjusted threshold.

25. The method of claim 24, further comprising determining a slope value based on the adjusted threshold.

26. The method of claim 25, further comprising generating a flag based on a change in the slope value relative to a baseline slope value.

27. The method of claim 15, wherein adjusting the actuator power level to move the head closer to the disk comprises adjusting the actuator power level of a thermal actuator coupled to the head.

28. The method of claim 15, wherein adjusting the threshold based on the second set of fly height values comprises determining a fixed threshold based on evaluating at least one most recent fly height value.

* * * * *